(12) United States Patent
Lai et al.

(10) Patent No.: US 10,983,571 B2
(45) Date of Patent: Apr. 20, 2021

(54) DISPLAY WITH ROTATABLE CAMERA STRUCTURE

(71) Applicants: Inventec (Pudong) Technology Corporation, Shanghai (CN); INVENTEC CORPORATION, Taipei (TW)

(72) Inventors: Yu-Hsiang Lai, Taipei (TW); Chia-Chen Chen, Taipei (TW); Tse-Yu Wu, Taipei (TW); Chi-Zen Peng, Taipei (TW); Ching-Yu Hua, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 34 days.

(21) Appl. No.: 16/575,377

(22) Filed: Sep. 18, 2019

(65) Prior Publication Data

US 2021/0055765 A1 Feb. 25, 2021

(30) Foreign Application Priority Data

Aug. 23, 2019 (CN) .......................... 201910784051.0

(51) Int. Cl.
*G03B 17/02* (2021.01)
*G06F 1/16* (2006.01)
*G03B 17/56* (2021.01)

(52) U.S. Cl.
CPC ........... *G06F 1/1686* (2013.01); *G03B 17/02* (2013.01); *G03B 17/563* (2013.01)

(58) Field of Classification Search
CPC ...... G03B 17/02; G03B 17/563; G06F 1/1686
See application file for complete search history.

(56) References Cited

U.S. PATENT DOCUMENTS

2003/0062490 A1* 4/2003 Fujieda .............. G06K 7/10881
250/556

FOREIGN PATENT DOCUMENTS

| TW | 201013301 A | 4/2010 |
|---|---|---|
| TW | I448763 B | 8/2014 |
| TW | I551142 B | 9/2016 |

* cited by examiner

*Primary Examiner* — Minh Q Phan
(74) *Attorney, Agent, or Firm* — CKC & Partners Co., LLC

(57) ABSTRACT

A display with a rotatable camera structure has a display region and includes a bezel with a lens and a rear cover connected to the bezel, and the rear cover has an opening. The bezel is disposed around the display region. The rotatable camera structure is between the bezel and the rear cover. The rotatable camera structure includes a dome holder, a camera and a dome cover. The dome holder with an opening is configured on the bezel and covers the lens. The camera is in the dome holder. The dome cover covers the opening of the dome holder, and the dome cover is connected to the camera through the opening of the dome holder. The dome cover has an angle adjustment structure exposed from the opening of the rear cover to adjust the filming angle of the camera for users.

10 Claims, 7 Drawing Sheets

DISPLAY WITH ROTATABLE CAMERA STRUCTURE

CROSS-REFERENCE TO RELATED APPLICATION

This application claims priority to China Application Serial Number 201910784051.0, filed Aug. 23, 2019, which are herein incorporated by reference in its entirety.

BACKGROUND

Field of Invention

The present invention relates to a display with a rotatable camera structure. More particularly, the present invention relates to the display for a laptop.

Description of Related Art

In recent years, because of the advancement of technology, it is common to do live broadcasts and interact directly with audiences with a camera. In general, a laptop has a built-in camera. However, most of the built-in cameras of the laptop are directly embedded in the upper part of the display bezel, and the built-in cameras cannot be adjusted at any angle. It is not convenient for taking images by the built-in camera.

The laptop is easy to carry and convenient for live broadcast outdoors. Therefore, the improvement of the filming angle of the camera in the laptop's display will be an interest topic for everyone.

SUMMARY

To achieve the above object, one aspect of the present disclosure is relative to a display with a rotatable camera structure.

According to one embodiment of the present disclosure, a display has a display region. The display includes a bezel, a rear cover and a rotatable camera structure. The bezel is located at the periphery of the display region and having a lens. The rear cover is connected to the bezel and has a first opening. The rotatable camera structure is located between the bezel and the rear cover. The rotatable camera structure includes a dome holder, a camera and a dome cover. The dome holder is configured on the bezel and covers the lens. The bottom of the dome cover has a second opening. The camera is located in the dome holder and has a camera lens aligned with the bezel's lens. The dome cover is connected to the camera through the second opening. The dome cover has an angle adjustment structure exposed from the first opening.

In one or more embodiments of the present disclosure, the angle adjustment structure includes a protruding structure.

In one or more embodiments of the present disclosure, the display further includes a handle. The handle is located in the dome holder. The camera is located on the handle. The handle has a side surface. The side surface is slidably attached to the inner wall of the dome holder. The dome cover is connected to the handle through the second opening.

In one or more embodiments of the present disclosure, the dome cover covers the second opening and the dome cover is slidably attached to the outer surface of the dome holder. The dome cover and the side surface of the handle co-clamp the dome holder.

In one or more embodiments of the present disclosure, the rear cover has a convex frame located on the first opening. The convex frame protrudes to the dome cover. The convex frame surrounds the exposed angle adjustment structure.

In one or more embodiments of the present disclosure, the handle includes a groove. The groove is concave from a top surface of the handle. The camera is located in the groove.

In one or more embodiments of the present disclosure, the display further includes a holding element. The groove has a third opening aligned with the holding element on the bottom of the groove. The dome cover has a holding socket aligned with the third opening and the holding element. The handle is connected to the dome cover by the holding element and the holding socket.

In one or more embodiments of the present disclosure, the holding socket is located on a bottom of the rear cover. The bottom is aligned with the exposed angle adjustment structure.

In one or more embodiments of the present disclosure, the display further includes a block in the dome cover. The block protrudes to the handle. The handle has a guiding trench concave from the side surface of the handle. The block is configured to engage to the guiding trench.

In one or more embodiments of the present disclosure, the display further includes a screw. The bezel has a screw socket. The dome holder has a through hole aligned with the screw socket of the bezel. The screw locks the dome holder to the screw socket by the through hole.

In summary, one embodiment of the prevent disclosure provides a rotatable camera structure between a bezel and a rear cover of a display. Because the dome holder is a hemispherical shell, the side surface of the handle and the dome cover can slidably hold the hemispherical shell, and the camera on the handle can slide along the hemispherical shell with the handle to achieve a desired filming angle beyond being along a single axis. In addition, the dome cover holding the dome holder with the handle is partially exposed from the opening of the dome cover, and the user can intuitively control the sliding of the camera through the exposed portion of the dome cover. In some embodiments, the exposed portion of the dome has an angle adjustment structure for facilitating the force application, and with the aid of the block and the guiding trench, the users can easily change the camera to a desired filming angle with a finger.

It is to be understood that both the foregoing general description and the following detailed description are by examples, and are intended to provide further explanation of the invention as claimed.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the invention.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

In addition, terms used in the specification and the claims generally have the usual meaning as each terms are used in the field, in the context of the disclosure and in the context of the particular content unless particularly specified. Some terms used to describe the disclosure are to be discussed below or elsewhere in the specification to provide additional guidance related to the description of the disclosure to specialists in the art.

Because most of built-in cameras in the display do not have rotating functions, the direction where the lenses of the built-in cameras face (e.g. the filming angle) cannot be adjusted. In order to improve the filming angle of the built-in camera in the display, the present disclosure provides a rotatable camera structure in the display, and further users can manually control the filming angle of the built-in camera in the display.

Figure 1:
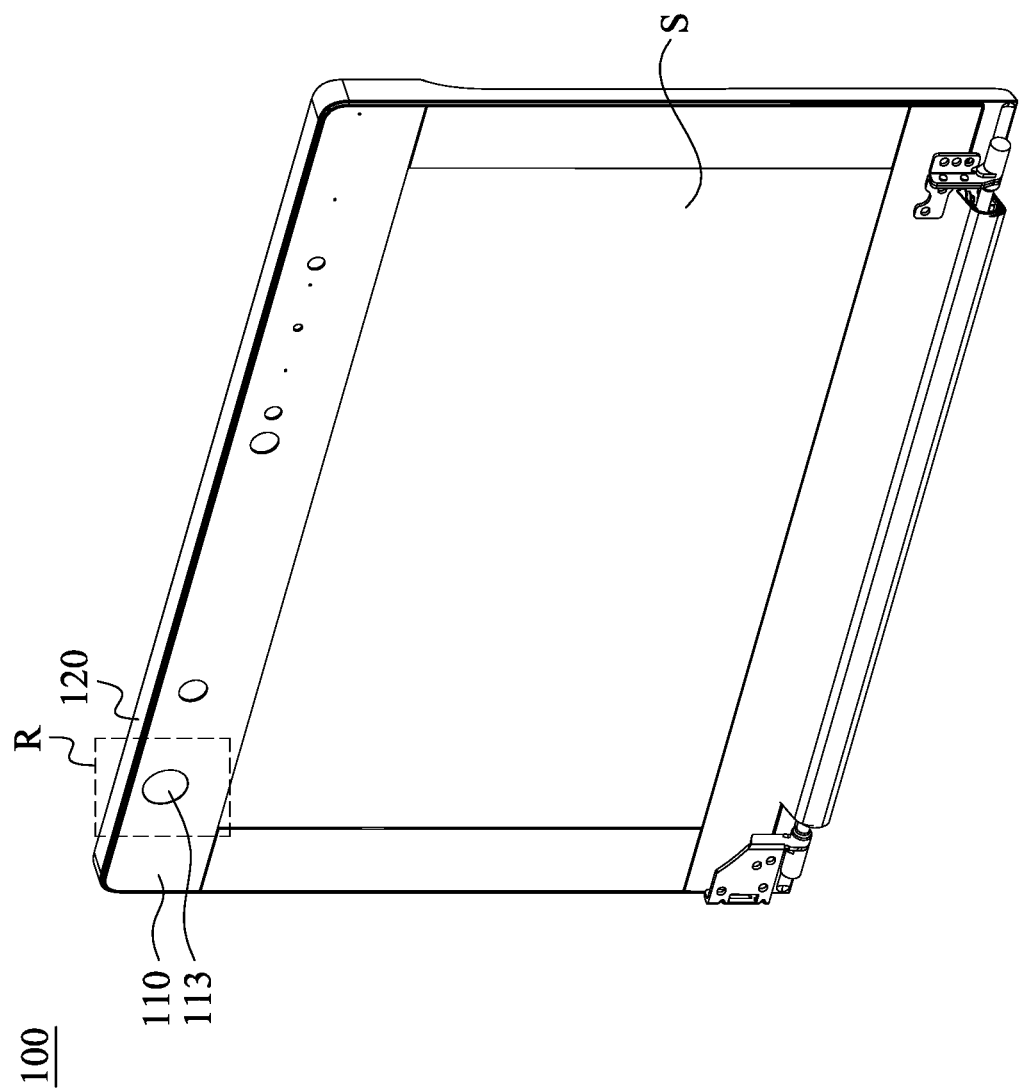
FIG. 1 is a perspective view of a display according to one embodiment of the present disclosure.

Please refer to FIG. 1. FIG. 1 is a perspective view of a display 100 according to one embodiment of the present disclosure. As shown in FIG. 1, for example, the display 100 is used for a laptop. The display 100 with a display region S has a bezel 110 and a rear cover 120. The bezel is located at the periphery of display region S. The rear cover is connected to the bezel 110. It should be understood that the type of the display is not limited to the display of the laptop. As shown in FIG. 1, the bezel has a lens 113. The rotatable camera structure (discussed below) is close to lens and located between the bezel 110 and the rear cover 120 (e.g., the region R in FIG. 1). In this embodiment, to hold the rotatable camera structure in the display 100, the upper portion of the display 100 has an extra space with larger thickness than the lower portion of the display 110. That is, in this embodiment, a larger housing space is between the bezel 110 and the rear cover 120 to hold the rotatable camera structure in the display 100.

Figure 2:
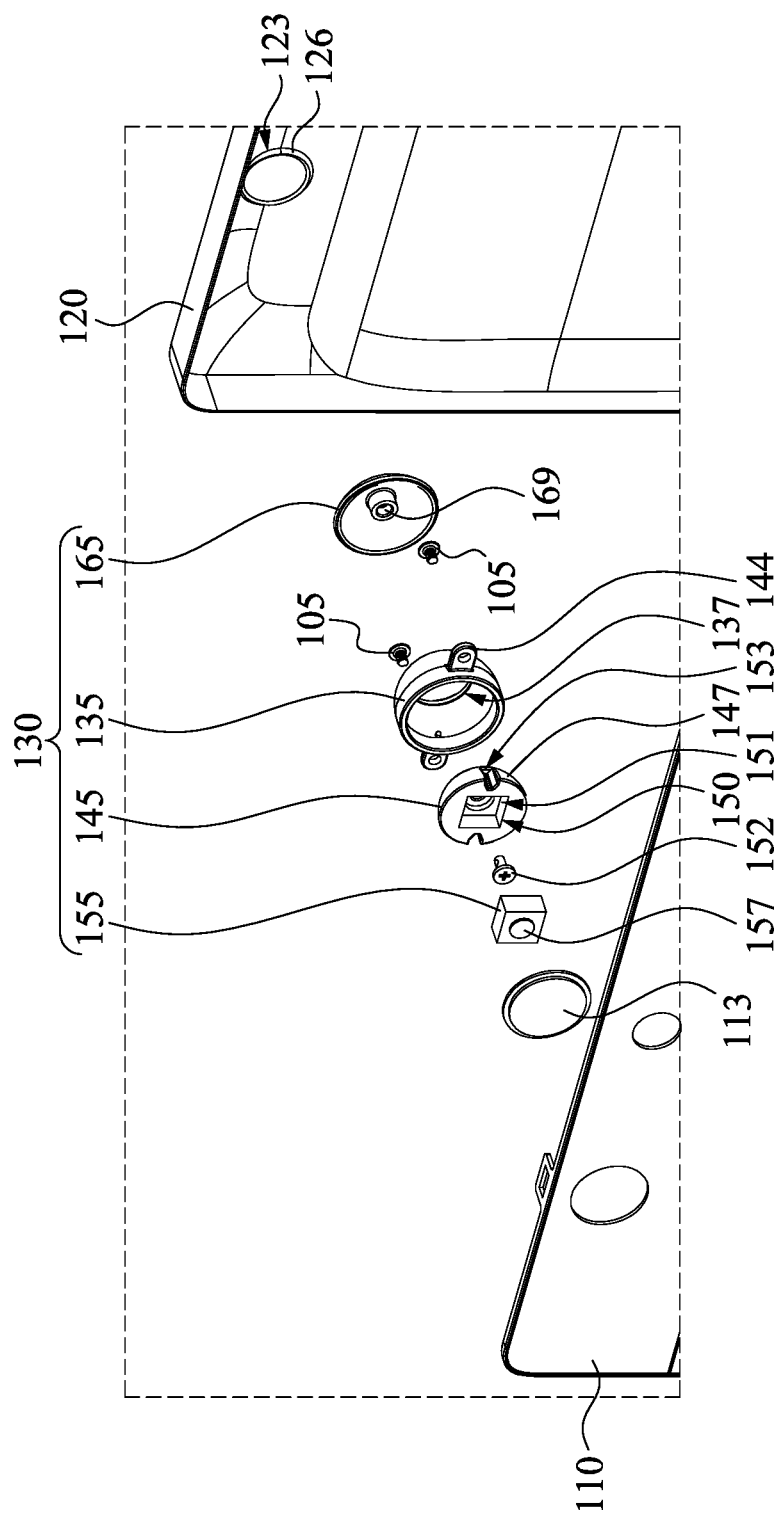
FIG. 2 is an exploded view of a rotatable camera structure of the display in FIG. 1.

Please refer to FIG. 2. FIG. 2 is an exploded view of a rotatable camera structure 130 of the display 110 in FIG. 1, and FIG. 2 further illustrates the combination of the rotatable camera structure 130 between the bezel 110 and the rear cover 120 (e.g., region R in FIG. 1). As shown in FIG. 2, the rotatable camera structure 130 includes dome holder 135, a handle 145, a camera 155 and a dome cover 165. In this embodiment, the rear cover further has an opening 123 and a convex frame 126 extended from the opening 123.

Figure 3:
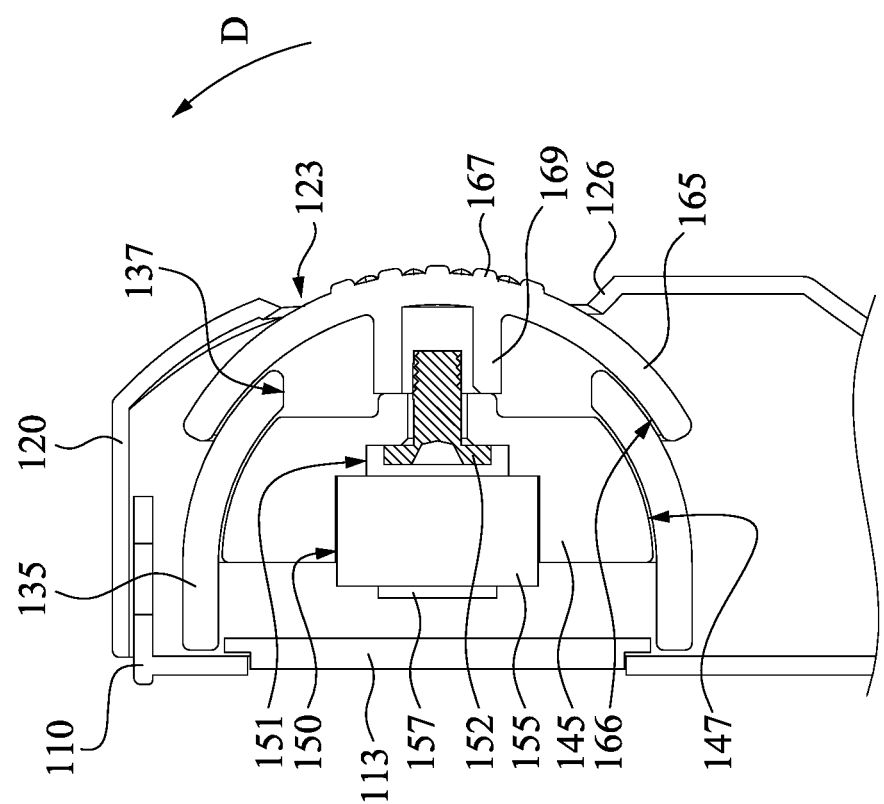
FIG. 3 is a cross-section of the rotatable camera structure in the display according to one embodiment of the present disclosure.

Please refer to FIG. 3. FIG. 3 is a cross-section of the rotatable camera structure 130. As shown in FIG. 3, in this embodiment, the dome holder 135 is a hemispherical shell, and an opening 137 is at the bottom of the dome holder 135. A handle 145 is located in the dome holder 135. The side surface 147 of the handle 145 is slidably attached to the inner wall of the dome holder 135. The top surface of the handle 145 faces to the lens 113 on the bezel 110, and a gap is between the lens 110 and the top surface of the handle 145. The camera 155 is located on the handle 145. In this embodiment, a groove 150 is on the top surface of the handle 145, the camera 155 is located in the groove 150, and the camera lens 157 of the camera 155 is aligned with the lens 113 of the bezel 110. In this embodiment, as shown in FIG. 3, an opening 151 is inside the groove 150. The opening 151 extends from the bottom of the groove 150 and penetrates to the other side with respect to the top surface of the handle 145. The opening 151 is exposed from the opening 137 of the dome holder 135.

In addition to the handle 145 and the camera 155 located within the dome holder 135, the rotatable camera structure 130 further has a dome cover 165. In FIG. 3, the dome cover 165 covers the opening 137 of the dome holder 135 from the outer wall of the dome holder 135, and the bottom surface 166 of the dome cover 165 is slidably attached to the outer wall of the dome holder 135.

A holding socket 169 is on the bottom surface 166 of the dome cover 165. In this embodiment, the holding socket 169 is abutted against the opening 151 of the groove 150 through the opening 137 of the dome holder 135, so that the holding element 152 corresponding to the holding socket 169 can be located in the opening 151. Further, as shown in FIG. 3, the handle 145 is locked and connected to the dome cover 165. In some embodiments, the holding element 152 and the holding socket 169 are, for example, screws and corresponding screw sockets. It should be understood that the above manner of connecting the handle 145 and the dome cover 165 through the opening 137 of the dome holder 135 is merely an example, and does not limit the manner of connecting the handle 145 and the dome cover 165.

As shown in FIG. 3, after the handle 145 is connected to the dome cover 165, the side surface 147 of the handle 145 and the bottom surface 166 of the dome cover 165 slidably and snugly hold the dome holder 135. In other words, the side surface 147 and the bottom surface 166 co-clamp the dome holder 135. The dome holder 135 is between the side surface 147 of the handle 145 and the bottom surface 166 of the dome cover 165. Therefore, it enables that the handle 145 and the dome cover 165 to move together, the handle 145 moves along the inner wall of the dome holder 135, and the dome cover 165 moves along the outer surface of the dome holder 135. In this embodiment, the dome holder 135 is a hemispherical shell. The handle 145 and the dome cover 165 move along the spherical surface of hemispherical shell.

When the handle 145 and the dome cover 165 hold the dome holder 135 to move along the spherical surface of the dome holder 135, which is a hemispherical shell, the camera lens 157 of the camera 155 located on the handle 145 can be always aligned with the center of hemispherical shell. As discussed above, the dome holder 135 covers the lens 113 such that the camera lens 157 of the camera 155 is always aligned with the lens 113 as the handle 145 and the dome cover 165 move. It enables that the camera 155 located on the handle 145 to have a rotational freedom to adjust the filming angle, rather than being limited to a single axial rotation.

Please return to FIG. 3. In this embodiment, the rear cover 120 has an opening 123. A portion of the dome cover 165 is exposed from the opening 123 of rear cover 120. The exposed portion of the dome cover 165 and the holding socket 169 are respectively located on the two relative side of the bottom of the dome cover 165. An angle adjustment structure is on the exposed portion of the dome cover 165. The purpose of the angle adjustment structure is to facilitate the application of force, so that the filming angle of the camera 155 can be easily and intuitively controlled by this angle adjustment structure. For example, in this embodiment, the angle adjustment structure is a plurality of protruding structures 167, and the protruding structures 167 are a plurality of small bumps protruding outward from the opening 123 of the rear cover 120. It enables that users adjust the filming angle of the camera 155 by directly contacting the exposed bumps on the dome cover 165. Specifically, in FIG. 3, the lens 113 of the bezel 110, the camera 155 located on the handle 145, the holding socket 169 and the protruding structure 167 are on the same straight line, and the camera lens 157 of the camera 155 is always aligned with the lens 113. Therefore, the user can slide the handle 145 along the dome holder 135 by contacting the protruding structures 167 on the exposed portion of dome cover 165, intuitively adjusting the filming angle of the camera 155 located on the handle 145.

It should be understood that the protruding structure 167 above is merely an example of the angle adjustment structure. For example, the angle adjustment structure can also be a groove that concaves from the dome cover 165. Users can contact their finger with the groove to apply force to rotate the camera 155, and the adjustment of the filming angle of the camera can also be achieved. Other ways to increase the friction generated during contact, so as to apply force to the design of the dome cover, can also be applied to the present disclosure.

The handle 145 and the dome cover 165 move along the dome holder 135, and the range of movement thereof substantially depends on the size of the opening 137 of the dome holder 135. As shown in FIG. 3, after the handle 145 and the dome cover 165 are moved in the direction of the arrow D, the handle 145 and the holding socket 169 of the dome cover 165 will abut against the opening 137 of the dome holder 135. It defines the moving range of the handle 145. In some embodiments, the purpose of limiting the movement of the handle 145 is to prevent the handle 145 from coming into contact with the lens 113 on the bezel 110 such that the lens 113 is undesirably detached. Therefore, in some embodiments, the size of the opening 137 of the dome holder 135 is designed such that when the holding socket 169 abuts the opening 137 of the dome holder 135, and the handle 145 just contacts the edge of the dome holder 135 to have the maximum filming angle without contacting the lens 113.

In this embodiment, the opening 123 of the rear cover 120 has a convex frame 126. The convex frame 126 protrudes toward the dome cover 165. The convex frame 126 is as close as possible to the dome cover 165 to prevent dust and dirt from falling between the bezel 110 and the rear cover 120 of the display 100 without hindering the sliding of the dome cover 165. In addition, in some embodiments, the exposed portion of the dome cover 165 has a protruding structure 167. The protruding structure 167 is designed to be in contact with the convex frame 126 of the rear cover 120. The protruding structure 167 limits the movement of the handle 145 to avoid unexpected contact of the handle 145 with the lens 113.

Figure 4:
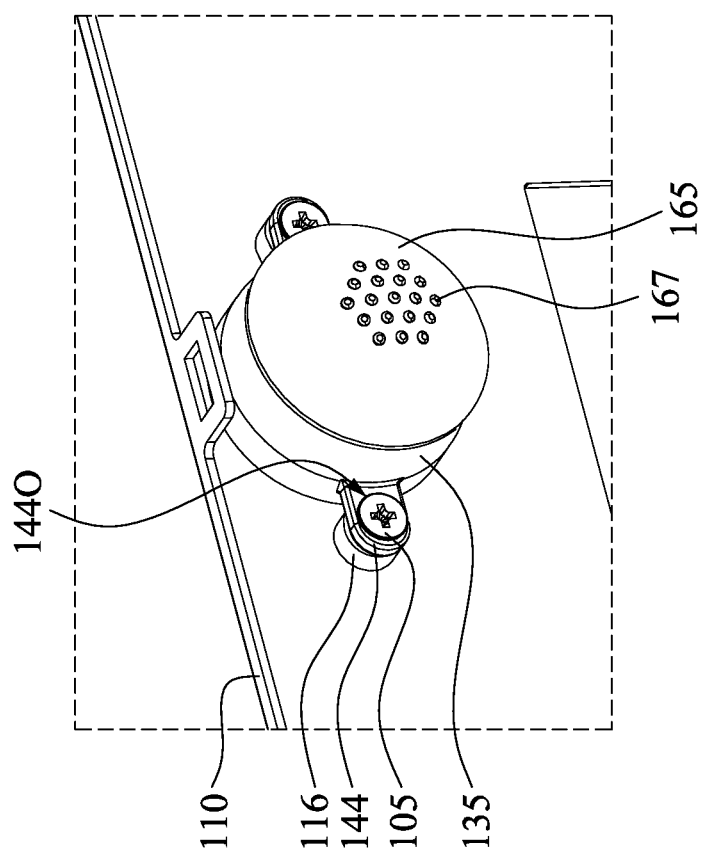
FIG. 4 illustrates the rotatable camera structure located at a bezel according to one embodiment of the present disclosure.

FIG. 4 illustrates the rotatable camera structure 130 located at a bezel 110 according to one embodiment of the present disclosure, wherein the rear cover 120 is omitted for illustrative purposes. In this embodiment, the rotatable camera structure 130 is fixed to the corresponding screw socket 116 on the bezel 110 by screws 105. As shown in FIG. 4, the bezel 110 has a screw socket 116 on both sides of the lens 113 (not shown in FIG. 4), and the two sides of the dome holder 135 of the rotatable camera structure 130 have corresponding protruding lock attachments 144. Each of the lock attachments 144 has an opening 1440. When the screw 105 is used for locking, the opening 1440 of the lock attachment 144 is aligned with the screw socket 116, so that the screw 105 can lock the dome holder 135 to the screw socket 116 of the bezel 110 through the opening 1440. The dome holder 135 covers the lens 113. It should be understood that the above fixing manner is merely an example, and should not be limited thereto.

Figure 5:
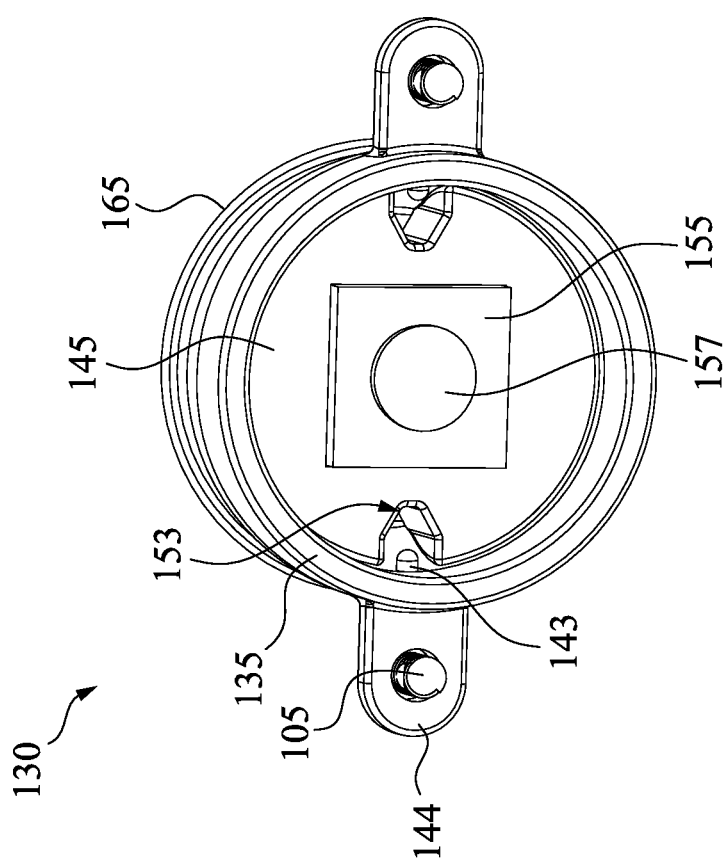
FIG. 5 is a front view of the rotatable camera structure according to one embodiment of the present disclosure.

FIG. 5 is a front view of the rotatable camera structure 130 according to one embodiment of the present disclosure. As shown in FIG. 5, in this embodiment, the dome holder 135 has blocks 143 therein, and the handle 145 further has guiding trenches 153. The guiding trenches 153 are recessed from the side surface 147 of the handle 145 (also shown in FIG. 2). The blocks 143 are configured to engage to the guiding trenches 153. In this embodiment, two blocks 143 are respectively on the two inner sides of the dome holder 135. The two blocks 143 are respectively configured to engage to the guide trench 153. The two corresponding guiding trenches 153 are on two sides of the top surface of the handle 145. The two blocks 143, the two guiding trenches 153 are substantially in line with the camera lens 157 of the camera 155. The purpose of providing the blocks 143 and the guiding trenches 153 is to more conveniently control the filming angle of the camera 155.

It should be understood that the filming of the camera 155 is directional. Since the handle 145 is free to slide on the dome holder 135, the camera 155 can be free from a single axial rotation. However, in the case of excessive rotation, it may be possible to make the captured image upside down if the rotatable camera structure does not limit to the rotational freedom of the camera 155. The blocks 143 and the guiding trench 153 are designed to prevent the camera lens 157 of the camera 155 from being reversed to avoid excessive rotation.

Figure 6B:
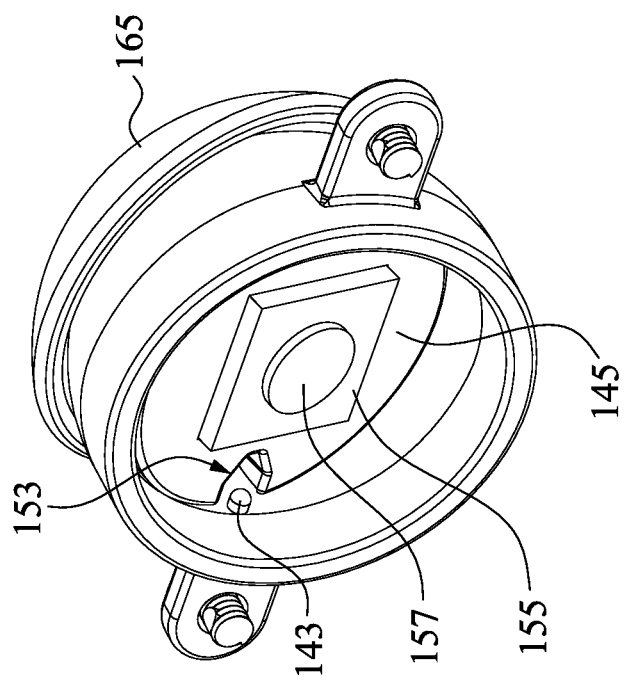
FIGS. 6A-6D illustrate the rotatable camera structure with different filming angle according to one embodiment of the present disclosure.
Figure 6A:
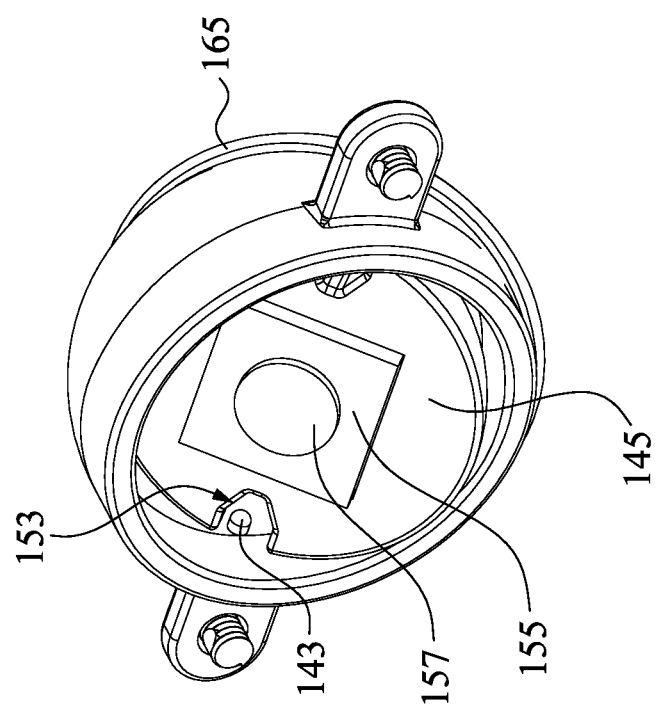

Please refer to FIGS. 6A to 6D. FIGS. 6A to 6D illustrate the rotatable camera structure with different filming angle according to one embodiment of the present disclosure. In FIGS. 6A and 6B, because the guiding trench 153 receives the blocks 143, the filming angle of the camera 155 can basically be adjusted by the two blocks 143. Sufficient space is between the guiding trenches 153 and the blocks 143, so that the rotational freedom of the camera 155 can still be maintained partially.

Figure 6C:
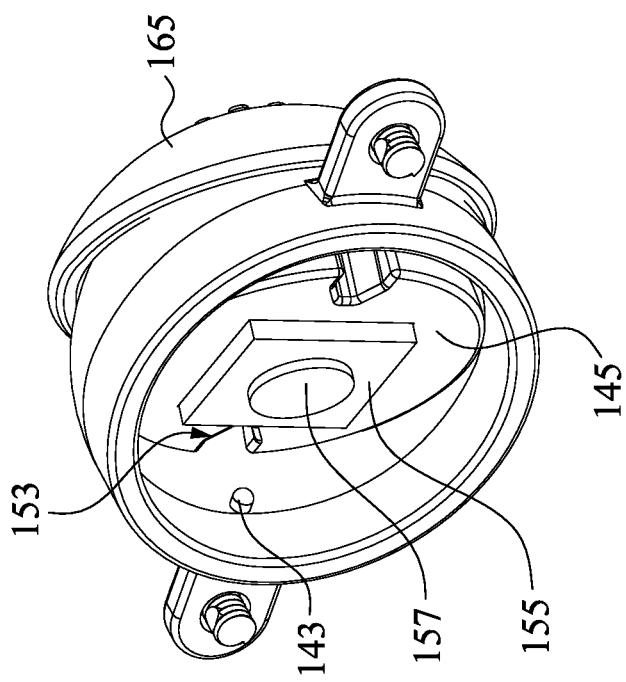
Figure 6D:
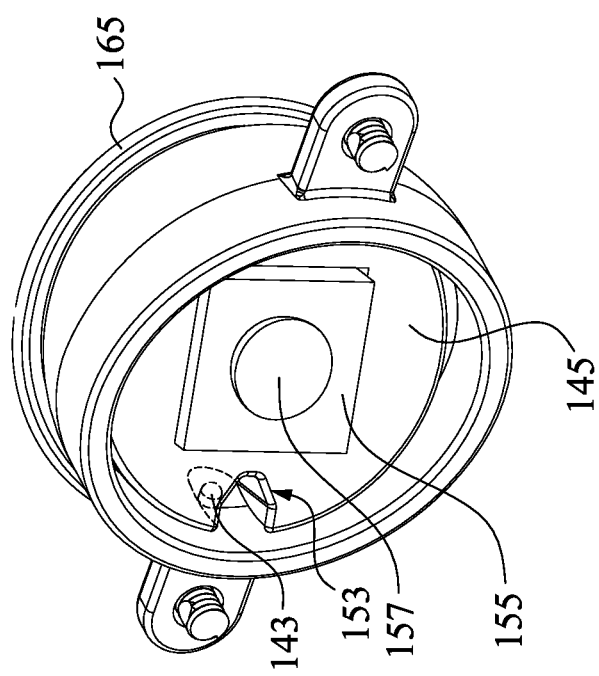

FIGS. 6C and 6D illustrate that the handle 145 rotates left and right against the block 143. As shown in FIG. 6C, a side of the guiding trench 153 can abut against the block 143 to easily achieve the rotation of the filming angle without reversing the camera 155. In order to prevent the handle 145 from rotating to reach the edge of the dome holder 135 and unexpected contact with the lens 113, the movement of the handle 145 can be further defined by the abutment of the blocks 143 and the bottom of the guiding trenches 153. With respect to FIG. 6C, the block 143 on the other side and the guiding trench 153 can also exert similar effects in FIG. 6D, thereby avoiding excessive rotation of the rotatable camera structure 130.

In summary, the present disclosure is relative to the rotatable camera structure located between the bezel and the rear cover. The rotatable camera structure's dome holder is located between the bezel and the rear cover. A handle is located in the dome holder, and the camera is located in the handle. Because the dome holder is a hemispherical shell slidably held by the side surface of the handle and the dome cover, the direction of filming is beyond the direction along a single axis. In addition, the rear cover of the display can have an opening. A portion of the dome cover is exposed from the opening of the rear cover. Therefore, users can control the filming angle of the camera by contacting the exposed portion of the dome cover. In some embodiment, the exposed portion of the dome cover has an angle adjustment structure for applying force to adjust the filming angle of the camera easily. Further, users can prevent the captured images from being upside down after the filming angle changing by the blocks and the guiding trenches, and users can also adjust the filming angle according the position of the blocks inside the guiding trenches.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without escaping from the scope or spirit of the invention. In view of the foregoing, it is intended that the present invention includes modifications and variations of this invention within the scope of the following claims.

What is claimed is:

1. A display having a display region, comprising:
   a bezel disposed at a periphery of the display region and having a lens;
   a rear cover connected to the bezel and having as first opening; and
   a rotatable camera structure disposed between the bezel and the rear cover, the rotatable camera structure comprising:
   a dome holder configured on the bezel and covering the lens, wherein the bottom of the dome holder has a second opening;
   a camera disposed in the dome holder and having a camera lens aligned with the lens of the bezel; and
   a dome cover connected to the camera through the second opening, wherein the dome cover has an angle adjustment structure exposed from the first opening to allow users to adjust the filming angle of the camera.

2. The display of claim 1, wherein the angle adjustment structure comprises a protruding structure.

3. The display of claim 1, further comprising:
   a handle disposed in the dome holder, wherein the camera is disposed on the handle, the handle has a side surface, the side surface is slidably attached to the inner wall of the dome holder,
   wherein the dome cover is connected to the handle through the second opening.

4. The display of claim 3, wherein the dome cover covers the second opening and the dome cover is slidably attached to the outer surface of the dome holder, the dome cover and the side surface of the handle co-clamp the dome holder.

5. The display of claim 4, wherein the rear cover has a convex frame located on the first opening, the convex frame protrudes to the dome cover, and the convex frame surrounds the exposed angle adjustment structure.

6. The display of claim 4, wherein the handle comprises a groove, the groove is concave from a top surface of the handle, and the camera is disposed in the groove.

7. The display of claim 6, further comprising a holding element, wherein the groove has a third opening aligned with the holding element on the bottom of the groove, the dome cover has a holding socket aligned with the third opening and the holding element, and the handle is connected to the dome cover by the holding element and the holding socket.

8. The display of claim 7, wherein the holding socket is located on a bottom of the rear cover and the bottom is aligned with the exposed angle adjustment structure.

9. The display of claim 4, further comprising a block located in the dome cover, the block protrudes to the handle, the handle has a guiding trench concave from the side surface of the handle, and the block is configured to engage to the guiding trench.

10. The display of claim 1, further comprising a screw, wherein the bezel has a screw socket, the dome holder has a through hole aligned with the screw socket of the bezel, and the screw locks the dome holder to the screw socket by the through hole.

* * * * *